(12) United States Patent
Zander et al.

(10) Patent No.: US 11,638,256 B2
(45) Date of Patent: Apr. 25, 2023

(54) METHOD AND SYSTEM FOR PERFORMING BEAM SWEEPING USING MULTIPLE POLARIZATION

(71) Applicant: Sony Corporation, Tokyo (JP)

(72) Inventors: Olof Zander, Södra Sandby (SE); Fredrik Rusek, Eslöv (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/262,244

(22) PCT Filed: Jun. 13, 2019

(86) PCT No.: PCT/SE2019/050558
§ 371 (c)(1),
(2) Date: Jan. 22, 2021

(87) PCT Pub. No.: WO2020/032847
PCT Pub. Date: Feb. 13, 2020

(65) Prior Publication Data
US 2021/0289487 A1    Sep. 16, 2021

(30) Foreign Application Priority Data
Aug. 10, 2018  (SE) .................................. 1850970-3

(51) Int. Cl.
*H04W 72/04*  (2009.01)
*H04W 72/044*  (2023.01)
(Continued)

(52) U.S. Cl.
CPC ........ *H04W 72/046* (2013.01); *H04B 7/0408* (2013.01); *H04B 7/063* (2013.01); *H04B 7/088* (2013.01); *H04B 7/10* (2013.01)

(58) Field of Classification Search
CPC ............... H04W 72/046; H04B 7/0408; H04B 7/063; H04B 7/088; H04B 7/10; H04B 16/18; H04B 7/0617; H04B 7/0695
See application file for complete search history.

(56) References Cited

U.S. PATENT DOCUMENTS 10,333,604 B2 *  6/2019  Forenza ................. H04W 24/02
2007/0080868 A1 *  4/2007  Hwang ..................... H04B 7/10
                                                                343/700 MS
(Continued)

FOREIGN PATENT DOCUMENTS

CN       1039051505 A    7/2014
CN        106559121 A    4/2017
(Continued)

OTHER PUBLICATIONS

International Search Report and Written Opinion for corresponding International Patent Application No. PCT/SE2019/050558 dated Sep. 12, 2019.
(Continued)

*Primary Examiner* — Mewale A Ambaye
(74) *Attorney, Agent, or Firm* — Renner, Otto, Boisselle & Sklar, LLP

(57) ABSTRACT

A method for operating an access node for transmission of radio signals in a plurality of beams of a beam sweep, includes: transmitting a first radio signal using a first polarization in a first beam having a first beam direction, and transmitting a second radio signal using a second polarization, which is different from the first polarization, in a second beam in said first beam direction, wherein the transmission of the first radio signal is linked to the transmission of the second radio signal in accordance with a predetermined rule. By means of such a link, a communication device may determine, based on the predetermined rule, that the first and second beams have a common
(Continued)

directionality, but are configured for transmission with different, preferably orthogonal, polarization.

16 Claims, 3 Drawing Sheets

(51) Int. Cl.
    *H04B 7/0408* (2017.01)
    *H04B 7/06* (2006.01)
    *H04B 7/08* (2006.01)
    *H04B 7/10* (2017.01)

(56) References Cited

U.S. PATENT DOCUMENTS

| | | |
|---|---|---|
| 2011/0085448 A1 | 4/2011 | Kuwahara |
| 2012/0052828 A1 | 3/2012 | Kamel et al. |
| 2016/0329636 A1 | 11/2016 | Larsson et al. |
| 2016/0337056 A1* | 11/2016 | Frenne ................ H04B 7/0413 |
| 2016/0365900 A1 | 12/2016 | Kim et al. |
| 2017/0019161 A1 | 1/2017 | Wang et al. |
| 2017/0244464 A1 | 8/2017 | Song et al. |
| 2018/0115305 A1 | 4/2018 | Islam et al. |
| 2018/0205436 A1 | 7/2018 | Gil et al. |
| 2018/0212662 A1 | 7/2018 | Ren et al. |
| 2019/0097693 A1 | 3/2019 | Park et al. |
| 2019/0341993 A1* | 11/2019 | Karabinis ............. H04W 52/42 |
| 2020/0314934 A1* | 10/2020 | Raghavan ............. H04W 76/15 |
| 2020/0322028 A1* | 10/2020 | Tosato ................ H04B 7/0469 |
| 2021/0105046 A1* | 4/2021 | Gutman ................ H04L 5/0023 |

FOREIGN PATENT DOCUMENTS

| | | |
|---|---|---|
| CN | 107592977 A | 1/2018 |
| CN | 108292942 A | 7/2018 |
| EP | 3 358 757 A1 | 8/2018 |
| JP | 2011087009 A | 4/2011 |
| WO | 2018/064348 A1 | 4/2018 |
| WO | 2018085638 A1 | 5/2018 |

OTHER PUBLICATIONS

Swedish Search report for corresponding Swedish Patent Application No. 1850970-3 dated Apr. 8, 2019.

Original and English Translation of Chinese Office Action issued for corresponding Chinese Patent Application No. 201980053549.8, dated Jan. 19, 2023.

Original and English Translation of Japanese Office Action issued for corresponding Japanese Patent Application No. 2021-506960, dated Feb. 7, 2023.

* cited by examiner

METHOD AND SYSTEM FOR PERFORMING BEAM SWEEPING USING MULTIPLE POLARIZATION

This application is a national phase of International Application No. PCT/SE2019/050558 filed Jun. 13, 2019, which claims priority to Swedish Application No. 1850970-3 filed on Aug. 10, 2018, the entire disclosures of which are hereby incorporated by reference.

TECHNICAL FIELD

The present invention relates to methods for operating a wireless communication system, in particular to methods for operating an access node of a wireless communication system according to multiple input and multiple output (MIMO) technologies. The present invention relates furthermore to an access node and a wireless communication system supporting the methods.

BACKGROUND

Increasing use of mobile voice and data communications may require a more efficient utilization of the available radio frequency resources. For increasing data transmission performance and reliability, the so-called multiple input and multiple output (MIMO) technology may be used in wireless radio telecommunication systems for transmitting information between the devices, for example between a base station and a user equipment. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

The so-called full dimensional MIMO (FDMIMO) refers to a technology that arranges the signals transmitted to antennas in the form of beams that are able to power multiple receivers in three dimensions. For example, a base station may comprise a large number of active antenna elements in a two-dimensional grid and the use of the FDMIMO technology enables a support of many spatially separated users on the same time/frequency resource blocks simultaneously. This may reduce interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic may need information about radio channel properties between the user equipment and the antennas of the base station. Vice versa, in order to adapt the transmit signal at each individual antenna of the user equipment, a user equipment logic may need information about the radio channel properties between the base station and the antennas of the user equipment. For this purpose, a so-called channel sounding may be performed to determine the radio channel properties between the user equipment and the base station. The channel sounding may comprise transmitting predefined pilot signals which may allow the base station and the user equipment to set their configuration antenna parameters for transmitting signals so as to focus radio energy or for receiving radio signals from a certain direction.

When the operational frequency increases and consequently the wavelength decreases, the antenna aperture becomes small and therefore multiple antennas may be utilized to increase the received power. In particular in case of high transmission frequencies of for example 30 GHz or more and multiple antennas having small apertures, the reception sensitivity may significantly depend on polarization of the transmitted radio-frequency signals. However, in particular when the user equipment is a movable device, the polarization of the antennas of the user equipment may vary with respect to the antenna arrangement of the base station.

In evolving standards, for example in 3GPP RAN1 Release 15, is defined that the base station broadcasts beam shaped synchronization signals (so-called SS-bursts). Different SS-bursts targeting different directions or polarizations are distributed both in time and frequency domain such that each beam is occurring at each sub-band over time. The user equipment may listen for the SS-bursts and may use the received signal to calibrate frequency and timing. The user equipment may scan or adjust its receive beam in order to find the direction that is associated with the strongest SS-burst. However, the polarization of the SS-burst signal may not be optimal for the user equipment depending on the current arrangement of the antennas of the user equipment.

In 3GPP Rel. 15 it is specified that a base station repeatedly perform beam sweeps in dedicated resources. Each transmitted beam comprises a CSI-RS (pilot), synchronization information, and a beam identifier (beam ID). It is not explicitly defined how different polarizations are to be treated and it is up to the base station to assign different beam ID to beams that differ only in polarization. This loose definition, on the other hand implies that there is no way for a UE to know what beams are associated from a spatial direction perspective. This is, however, information that is beneficial for the user equipment for determining which beam(s) to select, either during initial access and when the candidate beam list is populated.

In view of the above, there is a need in the art for methods and devices which address at least some of the above shortcomings of conventional MIMO systems. In particular, there is a need in the art for improving operation of devices in a wireless communication system to reduce the power losses of wireless communications due to polarization misalignments.

SUMMARY

According to the present invention, this object is achieved by the features of the independent claims. The dependent claims define embodiments of the invention.

According to a first aspect, a method is provided for operating a communication device for determining a beam report to an access node, based on radio signals received in a plurality of beams of an access node beam sweep, comprising:

receiving a first radio signal of a first polarization in a first beam having a first beam direction, and receiving a second radio signal of a second polarization, which is different from the first polarization, in a second beam in said first beam direction, determining that the first radio signal and the second radio signal were transmitted with different polarization but in a common direction based on a predetermined rule.

According to a second aspect, a method is provided for operating an access node for transmission of radio signals in a plurality of beams of a beam sweep, comprising:

transmitting a first radio signal using a first polarization in a first beam having a first beam direction, and transmitting a second radio signal using a second polarization, which is different from the first polarization, in a second beam in said first beam direction, wherein the transmission of the first radio signal is linked to the transmission of the second radio signal in accordance with a predetermined rule.

In one embodiment, a first beam identity allocated to said first beam is included in said first radio signal and a second beam identity allocated to said second beam is included in said second radio signal.

In one embodiment, the first beam and the second beam have a common beam identity, and wherein the first radio signal is transmitted using a first set of radio resources, and the second radio signal is transmitted using a second set of radio resources, wherein said predetermined rule links the first set of radio resources to the second set of radio resources.

In one embodiment, the first radio signal and the second radio signal are transmitted with a common beam identity in successive transmissions in one beam sweep.

In one embodiment, said predetermined rule links said first beam identity to the second beam identity.

In one embodiment, said steps of transmitting are carried out in a first beam sweep, wherein said predetermined rule includes carrying out a second beam sweep in which the second beam identity is allocated to the first beam and the first beam identity is allocated to the second beam.

In one embodiment, the method includes transmitting from the access node, and receiving in the communication device, (608) a beam report (620), based on the transmitted radio signals, from a communication device (30) configured to identify the link between the first and second radio signals according to said predetermined rule, wherein said beam report (620) includes an indication of radio resource positions allocated to one or more transmitted beams.

According to a third aspect an access node is provided, comprising an antenna arrangement for transmission of radio signals in a plurality of beams of a beam sweep; and a logic coupled to the antenna arrangement and configured to:

transmit a first radio signal using a first polarization in a first beam having a first beam direction, and transmit a second radio signal using a second polarization, which is different from the first polarization, in a second beam in said first beam direction, wherein the transmission of the first radio signal is linked to the transmission of the second radio signal in accordance with a predetermined rule.

In various embodiments, the logic of the communication device is configured to operate the communication device in accordance with any of the embodiments outlined above.

According to a fourth aspect, a communication device is provided, comprising an antenna for receiving radio signals transmitted in a plurality of beams of a beam sweep; and a logic coupled to the antenna arrangement and configured to:

receive a first radio signal of a first polarization in a first beam having a first beam direction, and receive a second radio signal of a second polarization, which is different from the first polarization, in a second beam in said first beam direction, determine that the first radio signal and the second radio signal were transmitted with different polarization but in a common direction based on a predetermined rule.

In various embodiments, the logic of the access node is configured to operate the communication device in accordance with any of the embodiments outlined above.

Although specific features are described in the above summary and in the following detailed description described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION

Figure 1:
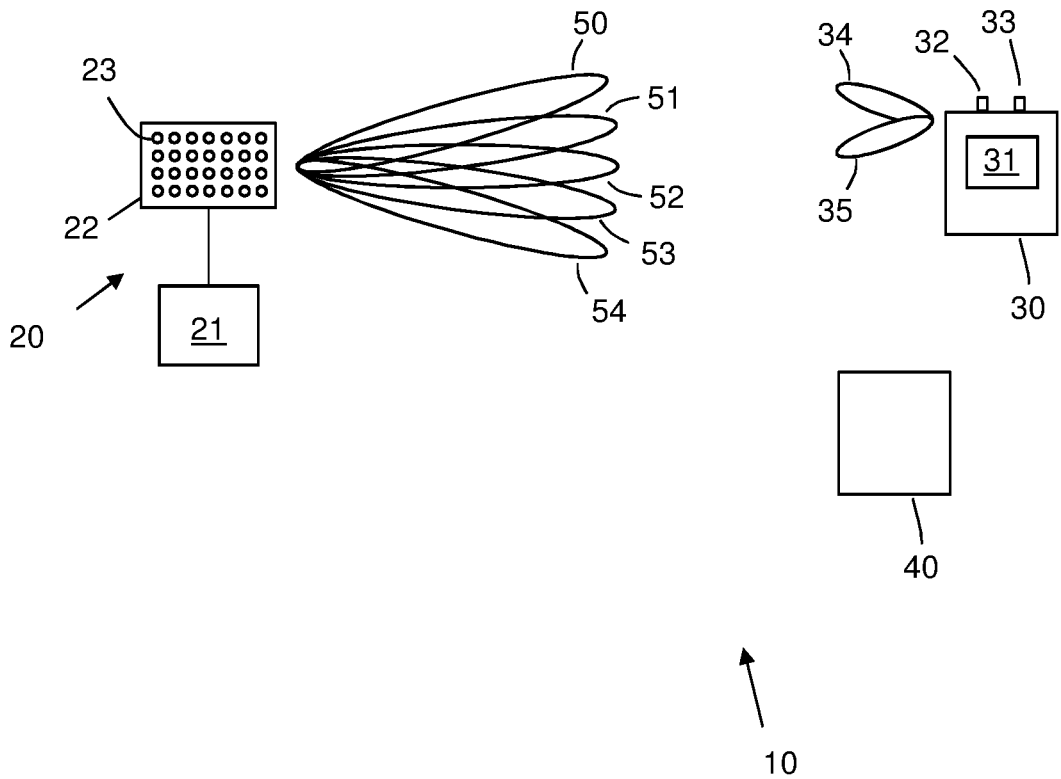
FIG. 1 schematically illustrates a wireless communication system according to an embodiment.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Embodiments are described in the context of radio communication in a wireless communication system, typically operating by means of radio communication or other electromagnetic communication. As such, the wireless communication system includes at least one wireless communication device, configured to communicate with a network via an access node. The network may include a core network and a plurality of access nodes connected to the core network. In various embodiments the wireless system may include a cellular wireless network, where a plurality of access nodes may cover a contiguous area and be configured to hand over communication or connection from one access node to another, as a wireless communication device moves from one cell to another. In such systems, access nodes are commonly referred to as base stations. In 3GPP systems for LTE the term eNB is used, and for 5G New Radio (NR) the term gNB has been employed. Alternatively, the access nodes may form discontinuous or uncorrelated coverage, and e.g. act as Wi-Fi access points or hotspots under one or more 3GPP 802.11 specification.

Herein, the term access node will generally be used to designate an entity of a wireless network, used for establishing and controlling an air interface for communication with wireless communication devices. Furthermore, communication device will be the term used for a wireless device configured to communication with an access node, and possibly directly with or via other communication devices. In specifications under 3GPP, such communication devices are generally referred to as user equipment, UE.

FIG. 1 shows a wireless communication system 10 according to an embodiment. The wireless communication system 10 includes an access node 20 and a plurality of communication devices. In FIG. 1, two communication devices 30 and 40 are shown. The access node 20 may support a so called multiple input and multiple output (MIMO) technology and therefore the access node 20 may have a large number of antennas, for example several tens or in excess of one hundred antennas.

The access node 20 comprises an antenna arrangement 22 comprising a plurality of antennas which are indicated by circles in FIG. 1. One exemplary antenna of the plurality of antennas is referenced by reference sign 23. The antennas 23 may be arranged in a two-dimensional or three-dimensional antenna array on a carrier. The access node 20 may comprise furthermore associated (not shown) transceivers for the antennas 23. The access node 20 comprises furthermore an access node logic 21. The access node logic 21 is coupled to the antenna arrangement 22 and comprises for example a controller, a computer or a microprocessor. The logic 21 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 21 over a data bus. The data storage device is considered a non-transitory computer readable medium. One or more processors of the logic 21 may execute instructions stored in the data storage device or a separate memory in order to carry out operation of the access node 20, as outlined herein. The access node 20 may comprise more components, for example a power supply, but these components are not shown in FIG. 1 for clarity reasons. Although in FIG. 1 only one antenna arrangement 22 is shown, the access node 20 may comprise more than one antenna arrangement, for example two, three, four or even more, for example several tens of antenna arrangements, which may cooperate with each other and which may be arranged near to each other or spaced apart.

The antenna arrangement 22 may be configured to transmit radio-frequency signals, or radio signals for short, into specific directions, herein referred to as beams. Five of these beams are shown in FIG. 1 and indicated by reference signs 50-54. The configuration of the beams may be static or dynamic. The transmission of radio frequency signals into a specific direction may be achieved by beamforming technologies as it is known in MIMO technologies. In connected mode, a communication device may be able to communicate with the access node 20 through one beam, or possibly more than one beam. However, the access node 20 may continuously announce its beams by beam sweeping, wherein the beams are individually announced in different resources, such as one at a time, where after communication devices are provided with the opportunity to report back to the access node 20, indicating one or more detected beams. This may be referred to as beam sweeping.

The antenna arrangement 22 may be equipped with dual polarized antennas and may therefore have the capability to transmit and/or receive signals with 30 any polarization, for example a first polarization and second polarization, wherein the first and second polarizations are orthogonal to each other. Furthermore, in particular spatially distributed antenna arrangements may be capable of transmitting radio-frequency signals having also a third polarization which is orthogonal to the first polarization and orthogonal to the second polarization.

In the communication system 10, as shown in FIG. 1, a plurality of communication devices like mobile phones, mobile and stationary computers, tablet computers, smart wearable devices or smart mobile devices may be arranged. Two exemplary communication devices 30 and 40 are shown in FIG. 1. Each of the communication devices 30 and 40 may be configured to communicate with the access node 20.

In the following, the communication device 30 will be described in more detail. However, the communication device 40 may comprise similar features as the communication device 30 and may therefore act similarly. The communication device 30 comprises one or more antennas. In the exemplary embodiment shown in FIG. 1, the communication device 30 comprises two antennas 32 and 33.

For example, the antennas 32, 33 may each comprise an antenna panel or an antenna array, or the antennas 32, 33 may be formed by an antenna array comprising a plurality of antennas. Furthermore, the communication device 30 comprises a logic 31. The logic 31 may comprise for example a controller or microprocessor. The logic 31 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 31 over a data bus. The data storage device is considered a non-transitory computer readable medium. One or more processors of the logic 31 may execute instructions stored in the data storage device or a separate memory in order to carry out operation of the communication device 30, as outlined herein. The communication device 30 may comprise more components, for example a graphical user interphase and a battery, but these components are not shown in FIG. 1 for clarity reasons. The antennas 32, 33 of the communication device 30 may be arranged spaced apart from each other, for example, the two antennas 32 and 33 may be arranged at a top side of the communication device near the edges. As an alternative, one or more antennas may be arranged at the top side and some other antennas may be arranged at a bottom side of the communication device 30. The two, or more, antennas 32, 33 form an antenna arrangement, whereby the communication device 30 may be configured to receive radio signals in multiple device beams 34, 35, e.g. multiple receive beams and multiple transmit beams, simply referred to herein as device beams 34, 35. For example, one device beam 34 may be configured for reception and/or transmission of radio signals with a first phase shift and a second device beam 35 may be configured for reception and/or transmission of radio signals with a second phase shift. In various embodiments, this may mean that a first beam 34 is configured to receive and/or transmit radio signals in first direction, whereas a second beam is configured to receive and/or transmit radio signals in a second direction. The communication device 30 is thereby configured for communication with spatial directivity. Such directions may be set by the antenna structure, or by phase adaptation by means of one or more phase shifters connected to the antenna arrangement 32, 33. Since a communication device 30 may be mobile, and thus rotatable with regard to the access node 20, device beam adaptation and/or selection may be repeatedly required.

The above described setup may, for example, be used advantageously in the following scenarios. For example, an access node 20 may be capable of communicating on arbitrary polarization. The communication device 30, e.g. in form of user equipment, may be limited to a single polarization or may be capable of distinguishing and selectively communicating in different polarizations. Furthermore, at least one of the devices may be mobile, such as the communication device 30. Further, uplink and downlink antennas/antenna panels may not be the same, such that reciprocity may not apply, or the number of uplink vs. downlink links is different.

Figure 2:
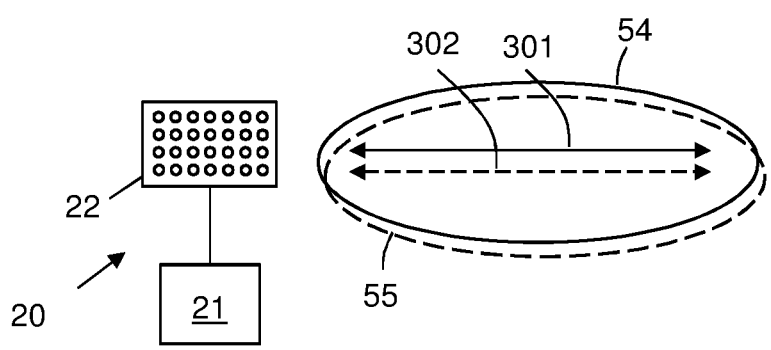
FIG. 2 schematically illustrates transmission of signals in two different beams of an access node, configured to transmit in multiple beams.

FIG. 2 illustrates the access node 20 of FIG. 1. In addition to what was laid out with reference to FIG. 1, the access node 20 may be configured to distinguish polarization in the device beams. This may e.g. be arranged by means of polarization ports connected between the phase shifters and the antenna arrangement 22. The access node 20 may be configured such that one beam 54 may be configured to receive and/or transmit radio signals 301 in a first polarization, whereas another beam 55 may be may be configured to receive and/or transmit radio signals 302 in a second polarization, which is different from the first polarization. More specifically, the first and second polarizations may be orthogonal.

The solutions provided herein are based on the notion that it may be beneficial for a communication device 30 to obtain knowledge of which access node beams are associated, in the sense that such beams have the very same directional properties but differ in polarization. The communication device 30 may then judge the potential of a beam pair, i.e. one access node beam and one device beam, and not only a determined link quality metric level for a received beam with arbitrary polarization. In many scenarios, the environment may impact the transmission channel between access node 20 and communication device 30 in a way that promotes a single polarization. If the access node beam is not aligned with this polarization such beams will not be considered by the communication device 30. It is thus suggested herein that the access node 20 direct at least two different beams 54, 55 with opposite polarization but otherwise with the same settings to be transmitted in such a common direction, and provide means for the communication device 30 to know this. Thereby, the communication device 30 can determine the potential performance an access node beam with optimal polarization will give.

If the access node 20 were to explicitly share a list of polarization-associated beams, this would increase the overhead and overall throughput would decrease. This is also not a method that is suitable to use in the initial access.

A method and an access node 20 is therefore suggested where implicit sharing of information of polarization-associated beams is provided. On a general level, one aspect of the proposed solution is related to a method for operating an access node 20 for transmission of radio signals in a plurality of beams 50-55 of a beam sweep.

In various embodiments, a beam 50-55 may be allocated or associated with a certain set of radio resources, and an antenna arrangement 22 may be configured by means of logic 21 to transmit said set of radio resources in a certain direction and with a certain polarization. The radio signal 301, 302 transmitted in a beam may be characterized by the information or data carried in the signal, using the radio resources of that beam.

The method involves transmitting a first radio signal 301 from the access node 20 using a first polarization in a first beam 54. The first beam 54 is configured to have a first beam direction, by means of the antenna arrangement 22 of the access node 20. The method further includes transmitting a second radio signal 302 using a second polarization, which is different from the first polarization. The second radio signal 302 is transmitted in a second beam 55, wherein the second beam 55 is configured to have the same first beam direction by means of the antenna arrangement 22 of the access node 20. In other words, the first 301 and second 302 radio signals are configured with common settings to have a common directionality, such as a common phase or phase shift, but different polarization. In certain embodiments, the first and second polarization are orthogonal. Moreover, the transmission of the first radio signal 301 is linked to the transmission of the second radio signal 302 in accordance with a predetermined rule.

Various embodiments will now be described in connection with this method, with reference to the drawings.

Figure 3:
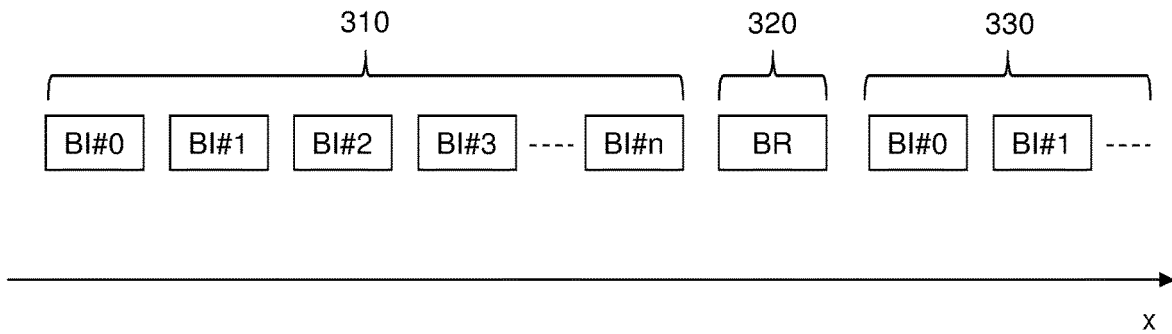
FIGS. 3-5 schematically illustrate various embodiments of configuration of beams in beam sweeping by an access node according to various predetermined rules.

FIG. 3 schematically illustrates transmission and reception scheduling in a beam sweep, associated with an access node 20, and will be used to describe a number of embodiments. It should be noted that the scheduling of FIG. 3 is exemplary, and not exclusive.

As a first beam sweep 310 is carried out, downlink (DL) transmission may be carried out by the access node 20. Specifically, radio signals may be transmitted in radio resources allocated to different beams having different beam indices BI. In the drawing, transmission in each beam is carried out at separate occasions along an axis x, which may be time and/or frequency. At a certain instance, typically after a completed DL weep 310, communication devices 30, 40 may be provided an uplink (UL) opportunity to transmit beam reports. Such beam reports may include at least an indication of BI for one or more received DL transmissions in the preceding beam sweep period 310, as detected by the respective communication device. The beam report may form a basis for the access node to select a beam pair in which to communicate signals and data with a communication device 30. In a period 330, a second beam sweep is executed, where again radio signals may be transmitted in radio resources allocated to different beams having different BI.

Among the beams used for transmitting radio signals, at least two are associated in the sense that they are transmitted in the same or correlated direction, but with different polarization. As an example, a first beam identity allocated to a first beam is included in a first radio signal transmitted in that beam, and a second beam identity allocated to a second beam is included in a second radio signal transmitted in that second beam.

In various embodiments, the predetermined rule may prescribe a link between such directionally correlated beams with opposite or at least different polarization. This link may be prescribed by specification, e.g. as a mandatory configuration of beams. This way, also communication devices 30, 40 configured to operate in a MIMO communication system are aware of the expected beam configuration with regard to directionally associated beams with different polarization. In an alternative embodiment, prescription may be mandatory in specification, whereby only communication devices making use of such a mandatory prescription may be configured to obtain information of which beams are directionally associated with different polarization. In yet another embodiment, a code transmitted in the transmission signals 301, 302, or other broadcast signal, may inform communication devices which receive such signals that the access node 20 employs a predetermined rule for link prescription of beam configuration.

In one embodiment, the predetermined rule may prescribe that beams are pairwise polarization associated with respect to the beam ID, BI. As an example, beams with BI [0 and 1] are associated [2 and 3] and [4 and 5] etc. This method can be any other ID pairs. Another example could be that BIs over a certain number are associated to beams with BI minus this number. Hence, [0 and 64], [1 and 65] [k and (k+64)] etc. For each such pair, one beam 55 having a first direction and a first polarization is uniquely linked to a second beam 56, having the same or correlated direction but a different polarization. The predetermined rule thus links a first beam identity to a second beam identity. This link may be obtained by a receiving communication device 30 based on detected BI in the received radio signals 301, 302.

This embodiment provides an efficient mapping of directionally associated beams without required additional communication of the configuration. It is furthermore easily implemented, as it its linked to BI which is nevertheless preferably included in the radio signal 301, 302 transmissions of the beams. For the same reason, the link is also easily obtained by communication devices 30, 40, by reading or decoding the received radio signals 301, 302.

Figure 4:
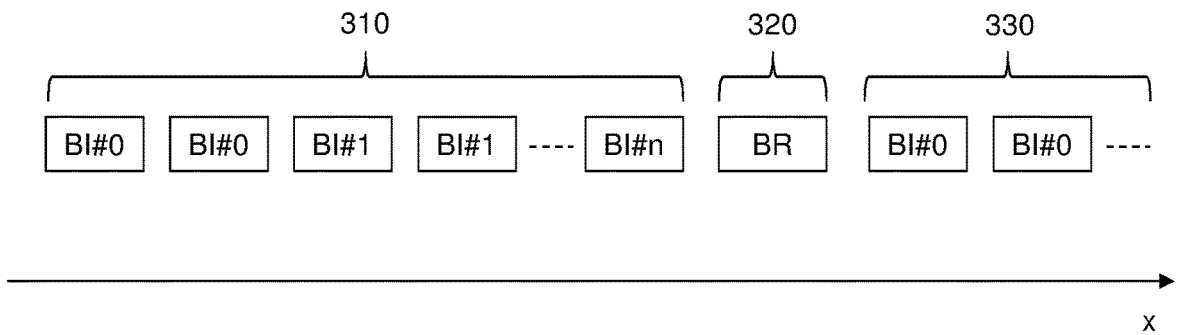

FIG. 4 shows another embodiment, similar to the embodiment of FIG. 3. However, in the embodiment of FIG. 4, the access node 20 is configured to use the same BI for beams with a common directionality but different polarization. Preferably, such beams are allocated to a different set of radio resources, in time and/or frequency. Specifically, a first beam 54 and a second beam 55 have a common beam identity, e.g. BI0. The first radio signal 301 is transmitted using a first set of radio resources, and the second radio signal is transmitted using a second set of radio resources, both in a beam labelled BI0. If both radio signals 301, 302 are received in a communication device 30 in one beam sweep, the communication device may be configured to deduce that these two radio signals 301, 302 represent different beams in terms of polarization with a common directionality, by means of a predetermined rule linking the first set of radio resources to the second set of radio resources.

In addition to the benefits outlined with respect to the previous embodiment, the embodiment described with reference to FIG. 4 has the additional technical effect that the predetermined rule does not limit the use of beam indices. If a total of e.g. 126 Bis are available to use, all said Bis may be used in this embodiment, instead of only half.

As shown in FIG. 4, such associated transmissions with a common beam index BI may be provided in successive pairs, i.e. 0, 0, 1, 1, 2, 2 etc. In alternative embodiments, transmissions with a common beam index BI in a common direction but with different polarization may be provided in pairs of other types of configuration in a sweep. As an example, radio signals may first be transmitted in all offered BIs in a first polarization, and thereafter radio signals may be transmitted in all offered BIs in a second polarization in the sweep.

According to this embodiment, communication devices 30 will be able to detect the same ID in different resources and directly know that they are different, but polarization associated, e.g. by orthogonality. As noted, this method further has the additional advantage that it will not increase the beam count.

Figure 5:
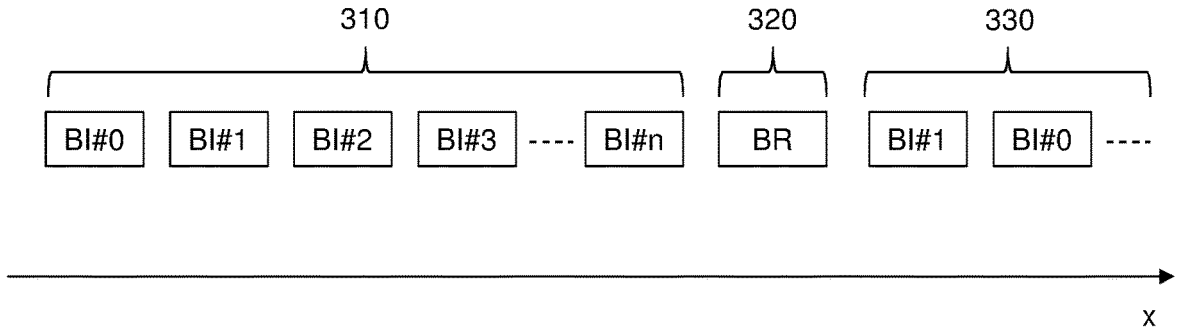

FIG. 5 illustrates another embodiment, which generally overlaps with the embodiments of FIGS. 3 and 4. However, a different rule is provided for linking associated beams is provided, i.e. a first beam 55 in which a radio signal of a first polarization is transmitted, and a second beam 56 in which a radio signal of a second polarization is transmitted, and where the first and second beams 55, 56 have a common directionality. This embodiment is based on the notion that beams of the access node 20 are normally scanned in a pattern that is repeated over time. A BI will then typically be allocated to predetermined radio resource positions. In the embodiment of FIG. 5 the access node 20 is configured to swap resource positions between associated beams and BIs. As shown in the exemplary drawing of FIG. 5, the BIs of at least the first two radio signals have swapped places. Put differently, a receiving communication device 30 may detect a BI #0 in a first resource position and a BI #1 in a second resource position, in a first sweep 310. In a subsequent sweep 330, the same receiving communication device 30 may detect BI #0 in said second resource position, and BI #1 in said first resource position. Since both the resource positions and the BIs are obtained by the communication device, the swap will be easily detected. In accordance with a predetermined rule, this identifies those two beams as associated with a common directionality but opposite polarization. The predetermined rule may thus include carrying out a second beam sweep, wherein a second beam identity is allocated to a first beam and the first beam identity is allocated to the second beam.

In various embodiments, a communication device 30 may be configured to transmit a beam report in UL, e.g. at 320. Even if the access node 20 may be configured to transmit radio signals in a multitude of beams, only a subset of those will normally be detected by the communication device. As outlined, the communication device may further be configured to receive radio signals in a plurality of device beams 34, 35. The beam report may include identification of beam pairs, each pair including a combination of one received beam 50-55 from the access node, identified by its BI, and possibly an identification of a device beam 34, 35. The access node 20 may be configured to receive such a beam report, based on the transmitted radio signals, from a communication device 30. Specifically, based on the implicitly informed combination of associated DL beams from the access node, as outlined herein according to a number of different rules for linking such DL beams, the communication device may be configured to identify the link between first and radio signals of beams with a common directionality but different polarization. This information may be used by the communication device 30 when selecting beam pairs to report. For instance, the communication device 30 may determine a potential performance one or more access node beam(s) with optimal polarization will give, and thereby include, or only include, the BIs for the most beams offering the best potential in terms of e.g. radio link quality or strength.

In one embodiment, each beam of a beam sweep is allocated a set of radio resources. However, rather than reporting BIs, the communication device 30 is configured to report resource positions. In such an embodiment, where the beam report includes radio resource positions of one or more transmitted beams, and preferably no BIs, method would enable a further reduction in overhead. Different resource positions are in such an embodiment preferably polarization associated, in a manner that a predetermined rule uniquely links a pair of resource positions to beams of different polarization but a common directionality.

Figure 6:
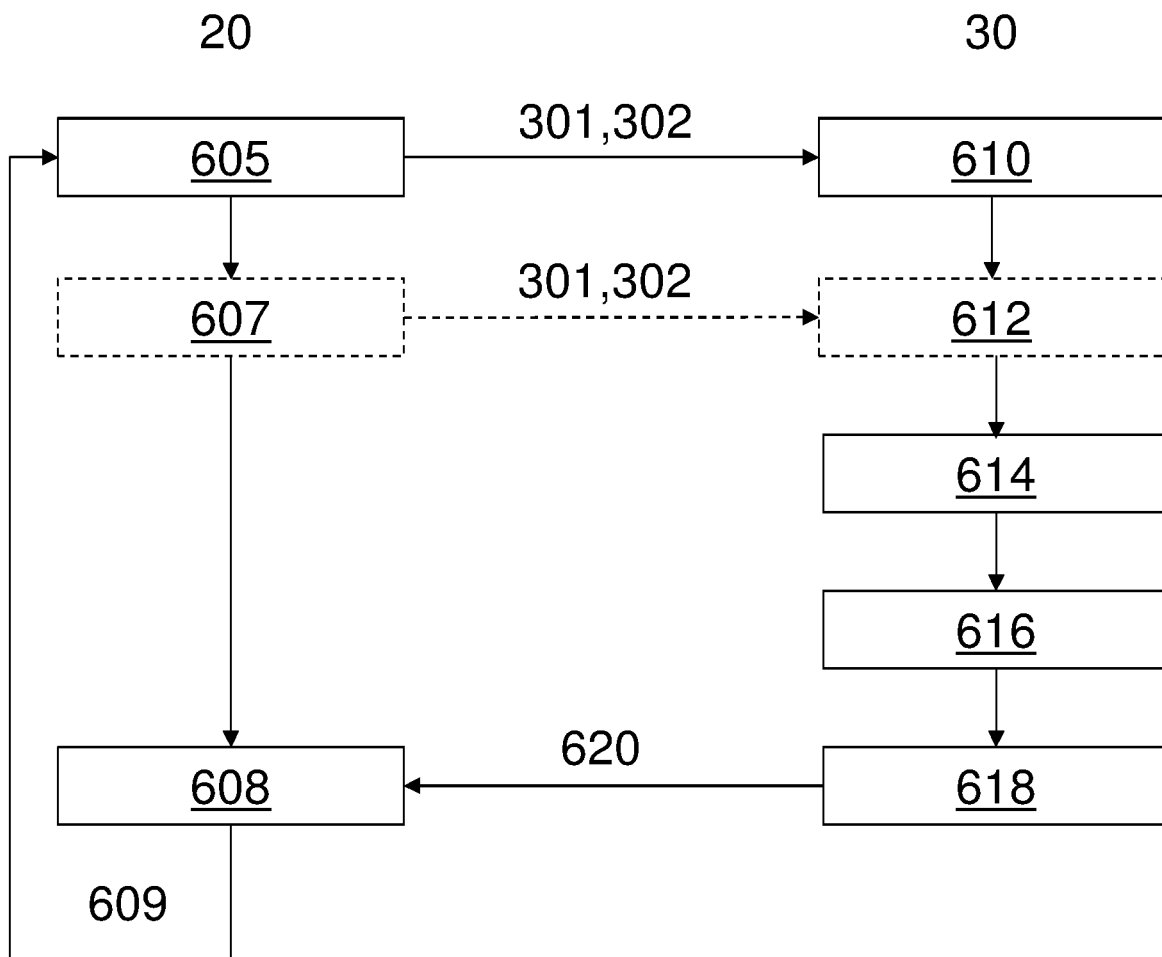
FIG. 6 shows a flowchart comprising method steps according to various embodiments.

FIG. 6 illustrates steps and signals transmitted and received in an embodiment of the invention. To the left, steps carried out by an access node 20 of a wireless communication network are shown. To the right, steps carried out by a communication device 30 are shown. The steps shown and described are consistent with the description provided throughout this specification, with reference to FIGS. 1-5.

In various embodiments, a method is provided for operating an access node 20 for transmission of radio signals in a plurality of beams 50-55 of one or more beam sweeps 310, 330. Furthermore, a method is provided for operating a communication device 30 for determining a beam report 620 to an access node 20, based on radio signals received in a plurality of beams 50-55 of an access node beam sweep 310.

In step 605, of a first beam sweep 310, the access node 20 transmits a first radio signal (301) using a first polarization in a first beam (54) having a first beam direction, and a second radio signal 302 using a second polarization. The polarization between the first and second radio signals are different, preferably orthogonal. However, they are transmitted in beams 54, 55 with a common direction. Furthermore, the transmission of the first radio signal is linked to the transmission of the second radio signal in accordance with a predetermined rule.

In step 610, a communication device 30 receives at least some radio signals transmitted by the access node 20, including the first 301 and second signals 302. The received radio signals may include beam indices BI related to the beams 54, 55 carrying the first 301 and second radio signals 302.

In step 607, carried out for some embodiments as outlined above with reference to FIG. 5, a second beam sweep 330 is carried out, in which polarization between the first 54 and second 55 beams are swapped.

In step 612, carried out if step 607 is carried out, the communication device receives radio signals in the beams 54, 55, whereby beam indices BI0 and BI1 are received in alternating resource positions in steps 610 and 612.

In step 614, the communication device 30 may determine, based on the predetermined rule that links the transmission of the first radio signal 301 and the second radio signal 302, that these are transmitted from the access node 20 at different polarization but with a common directionality. Differently put, the communication device may be configured to determine that the first radio signal and the second radio signal were transmitted with different polarization but in a common direction based on a predetermined rule.

In step 616, the communication device may be configured to determine one or more received beams 54, 55 for uplink report, or beam pairs each including one received beam and one device beam configured by a set of antennas 32, 33 of the communication device 30. This step may include selecting beams or beam pairs offering a satisfactory link quality, e.g. as determined by signal strength measurement of received radio signals 301, 302.

In step 618, the communication device 30 may transmit a beam report 620, based on the received radio signals 301, 302, and indicating selected beams, e.g. as determined instep 616. This may occur in a period 320, between a first 310 and a second 330 beam sweep of access node transmission in a number of beams. Since the communication device 30 is configured to identify the link between the first and second radio signals according to said predetermined rule, the beam report may be configured to an include an indication, such as BIs, of received beams of a common directionality and different polarization, even if one or both of the associated radio signals 301, 302 were not received with an optimum or satisfactory signal strength. In some embodiments, where each beam 54, 55 of a beam sweep 310 is allocated a set of radio resources, the beam report 620 may include radio resource positions of one or more transmitted beams. In particular, the beam report may include an indication of the resource position instead of beam index BI.

In step 608, the access node 20 receives the beam report 620, based on the transmitted radio signals 301, 302, from the communication device 30 configured to identify the link between the first and second radio signals according to said predetermined rule.

Step 609 goes to show that beam sweeping is a repetitive or re-occurring event, and that a period of beam sweep transmission 310, 330 may again commence after a period 320 of providing communication devices 30 the opportunity of transmitting in the UL, e.g. for transmitting beam reports.

The invention claimed is:

1. A method for operating a communication device for determining access node beams to select during initial access, based on radio signals received from an access node in a plurality of beams of an access node beam sweep, comprising:
   receiving a first radio signal of a first polarization in a first beam having a first beam direction, and
   receiving a second radio signal of a second polarization, which is different from the first polarization, in a second beam in said first beam direction,
   determining that the first radio signal and the second radio signal were transmitted with different polarization but in a common direction based on a predetermined rule; and
   transmitting a beam report, based on the received radio signals, wherein said beam report includes an indication of radio resource positions allocated to one or more transmitted beams.

2. The method of claim 1, wherein a first beam identity allocated to said first beam is included in said first radio signal and a second beam identity allocated to said second beam is included in said second radio signal.

3. The method of claim 1, wherein the first beam and the second beam have a common beam identity, and wherein the first radio signal is allocated a first set of radio resources, and the second radio signal is allocated a second set of radio resources, wherein said predetermined rule links the first set of radio resources to the second set of radio resources.

4. The method of claim 1, wherein the first radio signal and the second radio signal are transmitted with a common beam identity in successive transmissions in one beam sweep.

5. The method of claim 2, wherein said predetermined rule links said first beam identity to the second beam identity.

6. A communication device comprising:
   an antenna for receiving radio signals transmitted in a plurality of beams of a beam sweep; and
   a logic coupled to the antenna arrangement and configured to determine access node beams to select during initial access, based on radio signals received from an access node in a plurality of beams of the beam sweep, and to:
      receive a first radio signal of a first polarization in a first beam having a first beam direction,
      receive a second radio signal of a second polarization, which is different from the first polarization, in a second beam in said first beam direction,
      determine that the first radio signal and the second radio signal were transmitted with different polarization but in a common direction based on a predetermined rule; and
      transmit a beam report, based on the received radio signals, wherein said beam report includes an indication of radio resource positions allocated to one or more transmitted beams.

7. The communication device of claim 6, wherein a first beam identity allocated to said first beam is included in said first radio signal and a second beam identity allocated to said second beam is included in said second radio signal.

8. The communication device of claim 6, wherein the first beam and the second beam have a common beam identity, and wherein the first radio signal is allocated a first set of radio resources, and the second radio signal is allocated a second set of radio resources, wherein said predetermined rule links the first set of radio resources to the second set of radio resources.

9. The communication device of claim 6, wherein the first radio signal and the second radio signal are transmitted with a common beam identity in successive transmissions in one beam sweep.

10. The communication device of claim 6, wherein said predetermined rule links said first beam identity to the second beam identity.

11. A method for operating an access node for transmission of radio signals in a plurality of beams of a beam sweep, comprising:
    transmitting a first radio signal using a first polarization in a first beam having a first beam direction,
    transmitting a second radio signal using a second polarization, which is different from the first polarization, in a second beam in said first beam direction,
    wherein the transmission of the first radio signal is linked to the transmission of the second radio signal in accordance with a predetermined rule; and
    receiving a beam report, based on the transmitted radio signals, from a communication device configured to identify the link between the first and second radio signals according to said predetermined rule, wherein said beam report includes an indication of radio resource positions allocated to one or more transmitted beams.

12. The method of claim 11, wherein a first beam identity allocated to said first beam is included in said first radio signal and a second beam identity allocated to said second beam is included in said second radio signal.

13. The method of claim 11, wherein the first beam and the second beam have a common beam identity, and wherein the first radio signal is allocated a first set of radio resources, and the second radio signal is allocated a second set of radio resources, wherein said predetermined rule links the first set of radio resources to the second set of radio resources.

14. The method of claim 11, wherein the first radio signal and the second radio signal are transmitted with a common beam identity in successive transmissions in one beam sweep.

15. The method of claim 14, wherein said predetermined rule links said first beam identity to the second beam identity.

16. The method of claim 11, wherein said steps of transmitting are carried out in a first beam sweep, wherein said predetermined rule includes carrying out a second beam sweep in which the second beam identity is allocated to the first beam and the first beam identity is allocated to the second beam.

* * * * *